United States Patent
Lee

(10) Patent No.: US 12,437,770 B2
(45) Date of Patent: Oct. 7, 2025

(54) METHOD AND APPARATUS FOR USING INCREMENTAL SEARCH SEQUENCE IN AUDIO ERROR CONCEALMENT

(71) Applicant: Razer (Asia-Pacific) Pte. Ltd., Singapore (SG)

(72) Inventor: Kah Yong Lee, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 12 days.

(21) Appl. No.: 17/440,936

(22) PCT Filed: Mar. 25, 2019

(86) PCT No.: PCT/SG2019/050165
§ 371 (c)(1),
(2) Date: Sep. 20, 2021

(87) PCT Pub. No.: WO2020/197486
PCT Pub. Date: Oct. 1, 2020

(65) Prior Publication Data
US 2022/0165282 A1  May 26, 2022

(51) Int. Cl.
*G10L 19/022* (2013.01)
*G10L 19/005* (2013.01)
(Continued)

(52) U.S. Cl.
CPC .......... *G10L 19/022* (2013.01); *G10L 19/005* (2013.01); *H04L 43/0829* (2013.01);
(Continued)

(58) Field of Classification Search
CPC ..... G10L 19/022; G10L 19/005; H04L 65/75; H04L 43/0829; H04L 65/80; H04W 24/08
See application file for complete search history.

(56) References Cited

U.S. PATENT DOCUMENTS 5,689,440 A * 11/1997 Leitch ..................... G10L 19/00
                                                              370/206
5,737,009 A *  4/1998 Payton ............... H04N 21/2312
                                                              725/93
(Continued)

FOREIGN PATENT DOCUMENTS

CN          105223906 B     10/2017
CN          108831490 A     11/2018
(Continued)

OTHER PUBLICATIONS

Zhang, Wei-Qiang, and Jia Liu, "Two-Stage Method for Specific Audio Retrieval", Apr. 2007, 2007 IEEE International Conference on Acoustics, Speech and Signal Processing (ICASSP 2007), vol. 4, pp. 85-88. (Year: 2007).*

(Continued)

*Primary Examiner* — Daniel C Washburn
*Assistant Examiner* — James Boggs
(74) *Attorney, Agent, or Firm* — Polsinelli PC

(57) ABSTRACT

A method, a computer readable medium, and an apparatus for audio error concealment are provided. The apparatus may receive a plurality of audio frames. The apparatus may receive a first audio frame after the receiving of the plurality of audio frames. The apparatus may detect a second audio frame being lost in transmission. The second audio frame is transmitted after the plurality of audio frames and before the first audio frame. The apparatus may identify an audio segment within the plurality of audio frames that best matches a reference audio pattern of the plurality of audio frames. The identified audio segment may be received before a last audio frame of the plurality of audio frames. The apparatus may reconstruct the second audio frame based on audio data received subsequent to the identified audio segment.

19 Claims, 15 Drawing Sheets

(51) Int. Cl.
*H04L 43/0829* (2022.01)
*H04L 65/75* (2022.01)
*H04L 65/80* (2022.01)
*H04W 24/08* (2009.01)

(52) U.S. Cl.
CPC .............. *H04L 65/75* (2022.05); *H04L 65/80* (2013.01); *H04W 24/08* (2013.01)

(56) References Cited

U.S. PATENT DOCUMENTS

| | | | |
|---|---|---|---|
| 7,400,783 | B2 | 7/2008 | Sheu |
| 7,596,488 | B2 | 9/2009 | Florencio et al. |
| 7,873,515 | B2 | 1/2011 | Padhi et al. |
| 7,957,465 | B2 | 6/2011 | Dei et al. |
| 8,024,192 | B2 * | 9/2011 | Zopf .................... G10L 19/005 704/229 |
| 8,045,572 | B1 | 10/2011 | Li et al. |
| 8,346,546 | B2 | 1/2013 | Chen |
| 8,385,366 | B2 | 2/2013 | Sperschneider et al. |
| 8,428,953 | B2 * | 4/2013 | Ono .................... G10L 19/02 704/229 |
| 8,588,299 | B1 | 11/2013 | Yeo et al. |
| 9,118,744 | B2 | 8/2015 | Nagaraj et al. |
| 9,178,553 | B2 * | 11/2015 | Chen .................... H04B 1/1676 |
| 9,258,084 | B2 | 2/2016 | Zhovnirnovsky et al. |
| 9,613,629 | B2 | 4/2017 | Faure et al. |
| 9,648,351 | B2 | 5/2017 | Su et al. |
| 9,847,086 | B2 | 12/2017 | Bruhn |
| 10,032,457 | B1 * | 7/2018 | Liu .................... G10L 19/005 |
| 10,170,127 | B2 * | 1/2019 | Jung .................... G10L 19/005 |
| 11,055,318 | B2 * | 7/2021 | Tylenda ................ G06F 16/285 |
| 2005/0049853 | A1 | 3/2005 | Lee et al. |
| 2006/0011189 | A1 | 1/2006 | Simo et al. |
| 2007/0071404 | A1 | 3/2007 | Curtner et al. |
| 2008/0285656 | A1 | 11/2008 | Au et al. |
| 2009/0326934 | A1 | 12/2009 | Ono et al. |
| 2010/0312553 | A1 * | 12/2010 | Fang .................... G10L 19/005 704/226 |
| 2011/0218799 | A1 * | 9/2011 | Mittal .................... G10L 19/18 704/E19.01 |
| 2014/0088957 | A1 | 3/2014 | Kapilow |
| 2014/0142957 | A1 | 5/2014 | Sung et al. |
| 2014/0149273 | A1 * | 5/2014 | Angell .................... G06Q 40/04 705/37 |
| 2015/0002704 | A1 * | 1/2015 | Vidal-Naquet ........... G06T 5/50 348/241 |
| 2015/0371641 | A1 | 12/2015 | Bruhn |
| 2016/0020798 | A1 | 1/2016 | Chen |
| 2017/0192074 | A1 | 7/2017 | Seethamraju et al. |
| 2018/0034583 | A1 | 2/2018 | Low et al. |
| 2018/0077421 | A1 | 3/2018 | Sablin et al. |
| 2018/0277125 | A1 * | 9/2018 | Näslund ................ G10L 19/025 |
| 2018/0310022 | A1 | 10/2018 | Edpalm et al. |

FOREIGN PATENT DOCUMENTS

| | | |
|---|---|---|
| EP | 3131295 A1 | 2/2017 |
| KR | 10-2016-0075790 A | 6/2016 |

OTHER PUBLICATIONS

Lin, Anthony, "Binary Search Algorithm", Jan. 2019, WikiJournal of Science, vol. 2, No. 1, pp. 1-13, https://search.informit.org/doi/10.3316/informit.573360863402659. (Year: 2019).*

Hulín, Matej, "Performance Analysis of Sorting Algorithms", 2017, Thesis, Masaryk University Faculty of Informatics, Pole-Ponava, Czechia. (Year: 2017).*

International Search Report and Written Opinion, dated Dec. 24, 2019, for the corresponding International Application No. PCT/SG2019/050165 in 7 pages.

Manikandan, L.C., Nair, S.A.H., Sanal Kumar, K.P. et al. A study and analysis on block matching algorithms for motion estimation in video coding. Cluster Computing; First Online: Dec. 9, 2017 in 8 pages.

L.C.Manikandan; Dr.R.K.Selvakumar, A new block matching algorithm for video coding using fibonacci sequence. International Journal of Advanced Scientific and Technical Research Issue 4 vol. 4, Jul.-Aug. 2014 in 7 pages.

Extended European Search Report mailed Feb. 24, 2022, 12 pages, for the corresponding European Patent Application No. 19921268.9.

Goodman D J et al: "Waveform substitution techniques for recovering missing speech segments in packet voice communications", XP-002973610, IEEE Transactions On Acoustics, Speech and Signal Processing, vol. ASSP-34, No. 6, Dec. 1986, IEEE Inc. New York, USA in 9 pages.

Chinese first notice of examination opinion; dated Oct. 25, 2023; application # 201980094505.X.

European Search Report; dated Mar. 27, 2025; Application # 19921268.9.

* cited by examiner

METHOD AND APPARATUS FOR USING INCREMENTAL SEARCH SEQUENCE IN AUDIO ERROR CONCEALMENT

TECHNICAL FIELD

Various aspects of this disclosure generally relate to signal processing, and more particularly, to audio error concealment.

BACKGROUND

In a digital wireless audio application, namely wireless speaker or wireless headset, audio data is packetized and sent from a transmitter to a receiver in burst. Retry mechanism is implemented to improve the success rate of audio data transmission in such a digital wireless audio application. However, audio data packet (may also be referred to as audio frame) may be dropped if it fails to be transmitted after a specific number of retry. Listener may hear a popping or cracking noise when there is an audio signal gap due to packet lost (i.e., dropped packet).

FIG. 1 illustrates an example of an audio signal gap caused by packet lost. In the example, the original audio data transmitted by the transmitter is shown in diagram 100. The audio packets received by the receiver is shown in diagram 120. A packet 122 is lost during transmission. Such packet loss may cause popping or cracking noise, thus detrimentally affecting user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless audio streaming application, audio data has to reach the receiver in a given time period. However, the audio data might be interfered and not received by the receiver. In that case, there will be an audio gap during receiver playback. In one aspect of this disclosure, a method to search for similar audio waveform from past history to reconstruct the missing audio data is provided. It may preserve the continuity of the audio waveform, resulting in better audio playback quality, less popping and cracking noise.

In an aspect of the disclosure, a method, a computer readable medium, and an apparatus for audio error concealment are provided. The apparatus may receive a plurality of audio frames. The apparatus may receive a first audio frame after the receiving of the plurality of audio frames. The apparatus may detect a second audio frame being lost in transmission. The second audio frame is transmitted after the plurality of audio frames and before the first audio frame. The apparatus may identify an audio segment within the plurality of audio frames that best matches a reference audio pattern of the plurality of audio frames. The identified audio segment may be received before the last audio frame of the plurality of audio frames. The apparatus may reconstruct the second audio frame based on audio data received subsequent to the identified audio segment.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
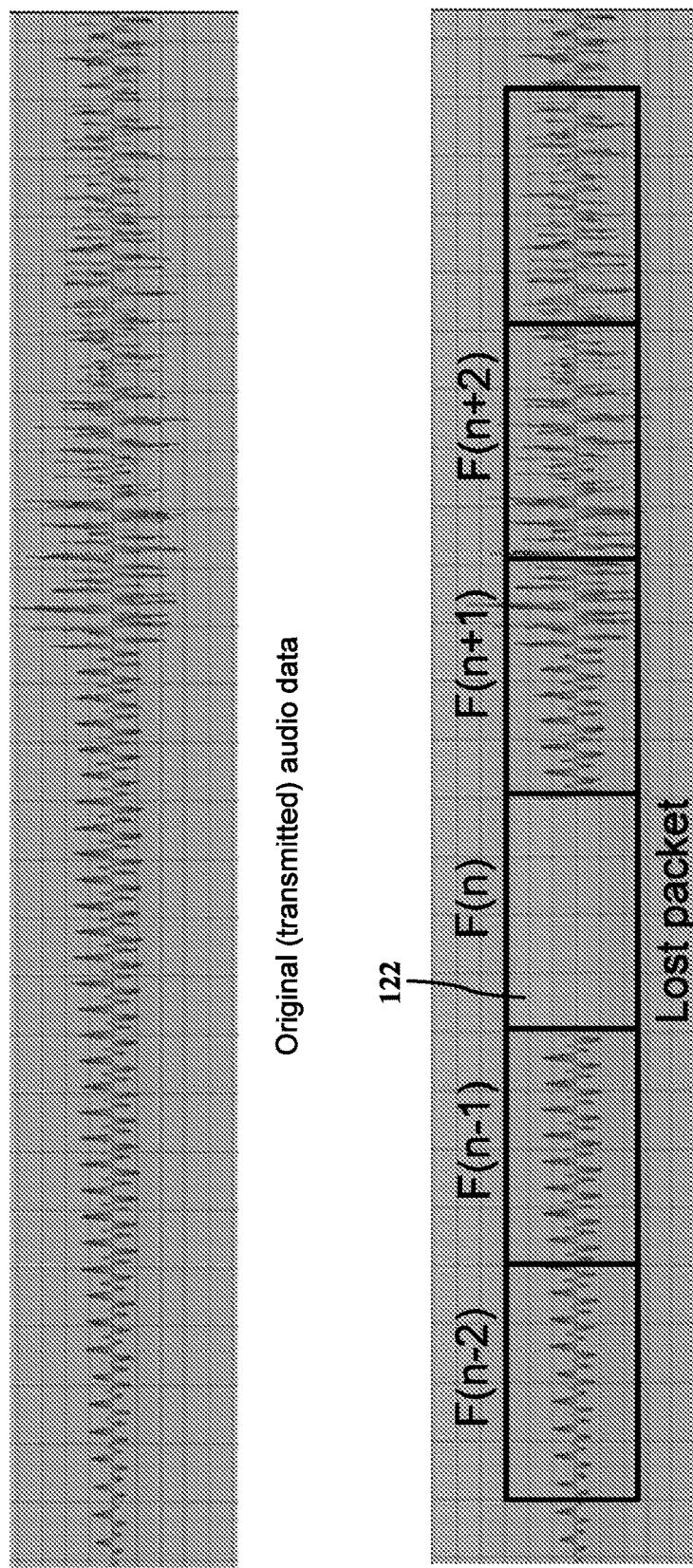
FIG. 1 illustrates an example of an audio signal gap caused by packet lost.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of audio error concealment will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 2:
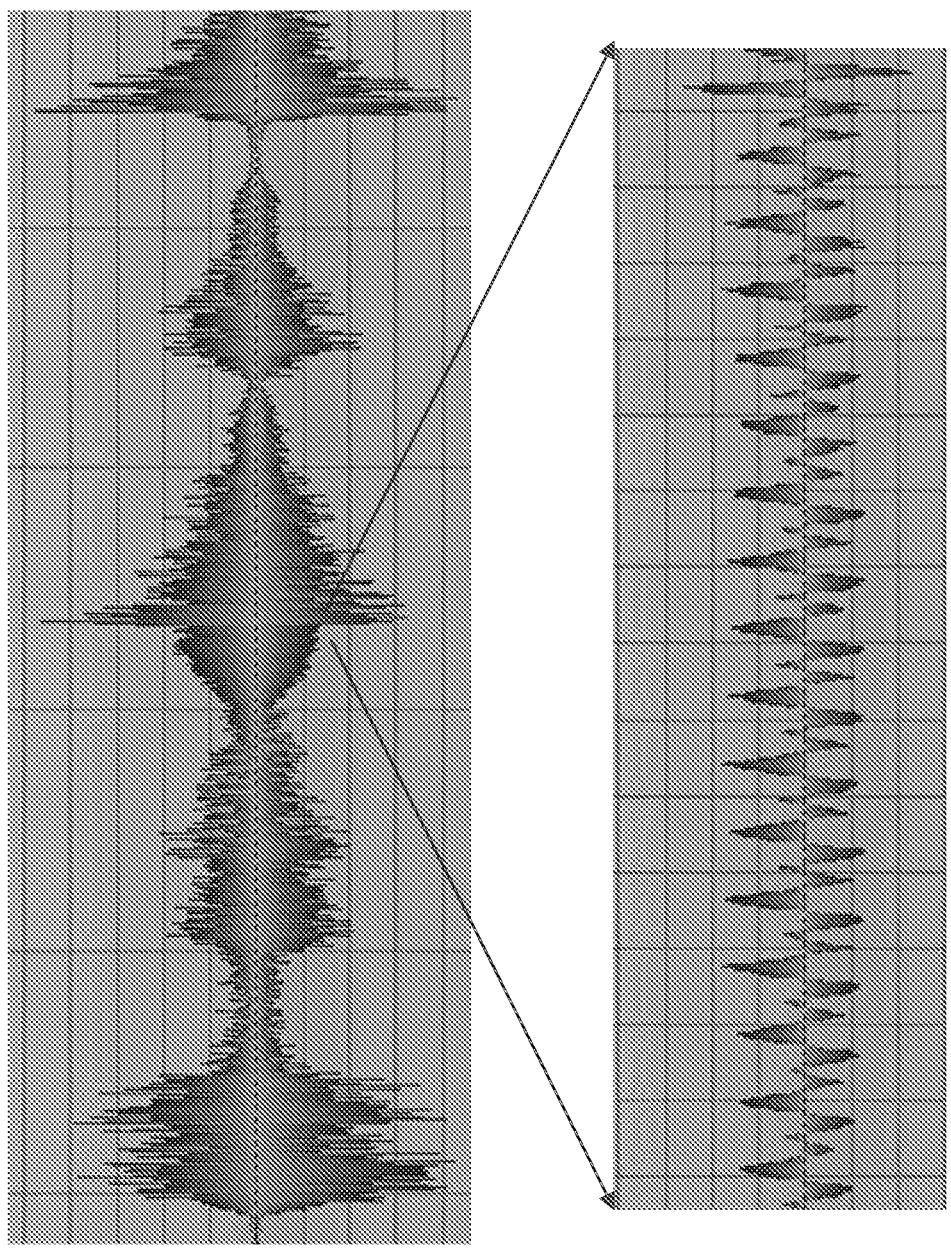
FIG. 2 illustrates an example of audio waveform in long-term and short-term views.

Some embodiments of the disclosure implement an efficient search method that makes use of incremental search sequence to find similar waveform from the past history and reconstruct/recreate the missing audio data using the short-term periodic properties of audio signal. FIG. 2 illustrates an example of audio waveform in long-term and short-term views. The diagram 200 shows multi-tone frequency with random period when looking at long-term interval. The diagram 220 shows multi-tone frequency with periodic interval when looking at short-term interval. The audio signal in the diagram 220 may be a small segment of the audio signal in the diagram 200.

Figure 3:
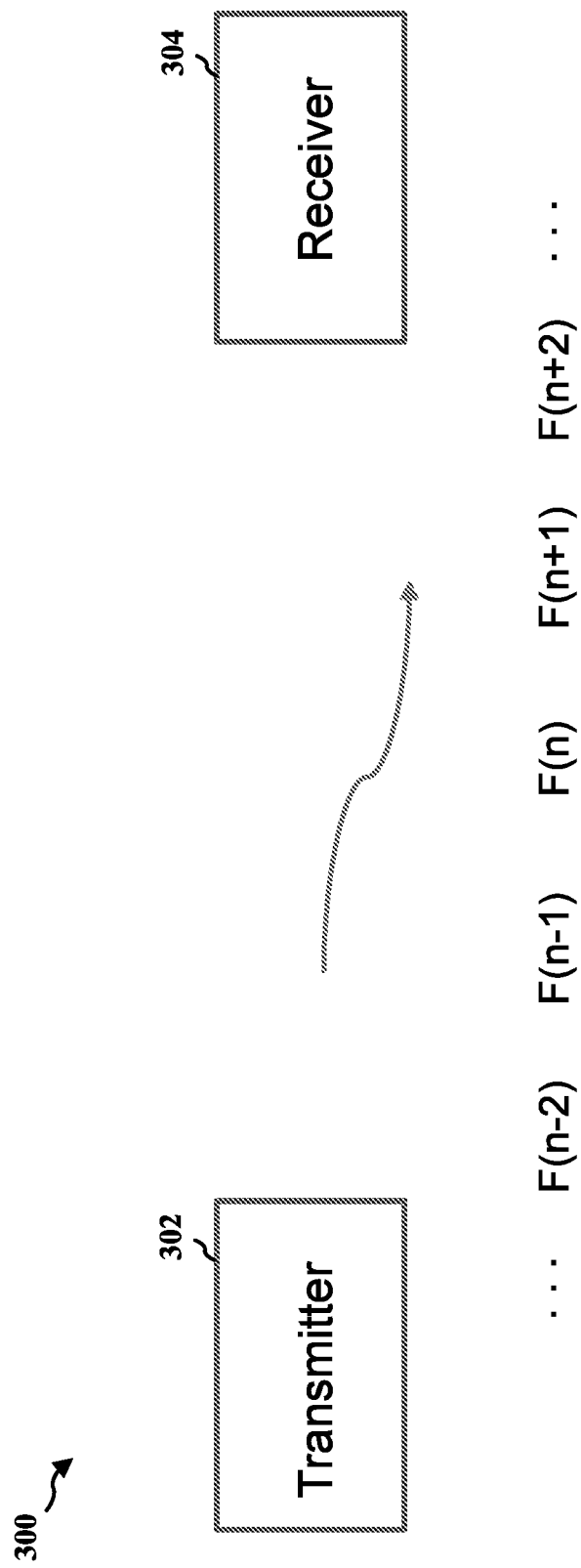
FIG. 3 is a diagram illustrating an example of audio data being transmitted in frames in wireless audio application.

FIG. 3 is a diagram 300 illustrating an example of audio data being transmitted in frames in wireless audio application. In the example, a transmitter 302 sends audio data in frames (e.g., F(n−2), F(n−1), F(n), F(n+1), F(n+2), etc.) to a receiver 304. Since audio data is sequential in nature, the frames are transmitted according to the sequence of the audio data.

In some embodiments, a frame is a digital data transmission unit in wireless communication. In some embodiments, a frame may be a simple container for a single network packet. In some embodiments, a frame may be a repeating structure supporting time-division multiplexing. In some embodiments, a frame may have a pre-determined length in time.

In some embodiments, all audio frames may be tagged with a frame sequence number (FSN). In such embodiments, a missing frame may be detected by checking the sequence of received frame sequence numbers.

Figure 4:
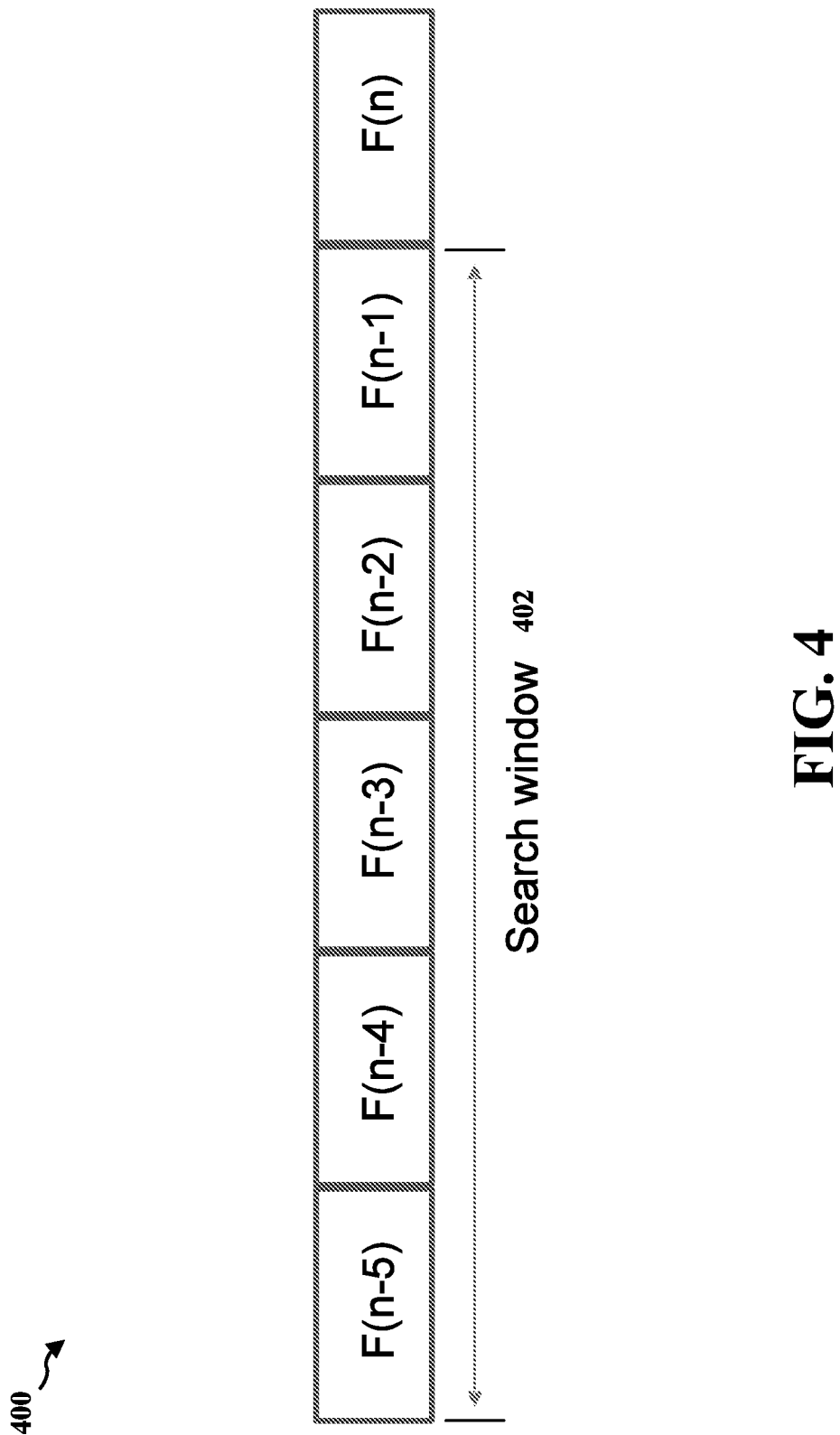
FIG. 4 illustrates an example of an audio data FIFO queue.

In some embodiments, received audio data may be stored in a first in first out (FIFO) queue for pattern matching purposes. FIG. 4 illustrates an example of an audio data FIFO queue 400. In the example, the FIFO queue 400 may have stored several audio data frames, e.g., from F(n−5) to F(n). A search window 402, e.g., from F(n−5) to F(n−1), may be selected to find similar waveform from recently received audio data frames.

Figure 5:
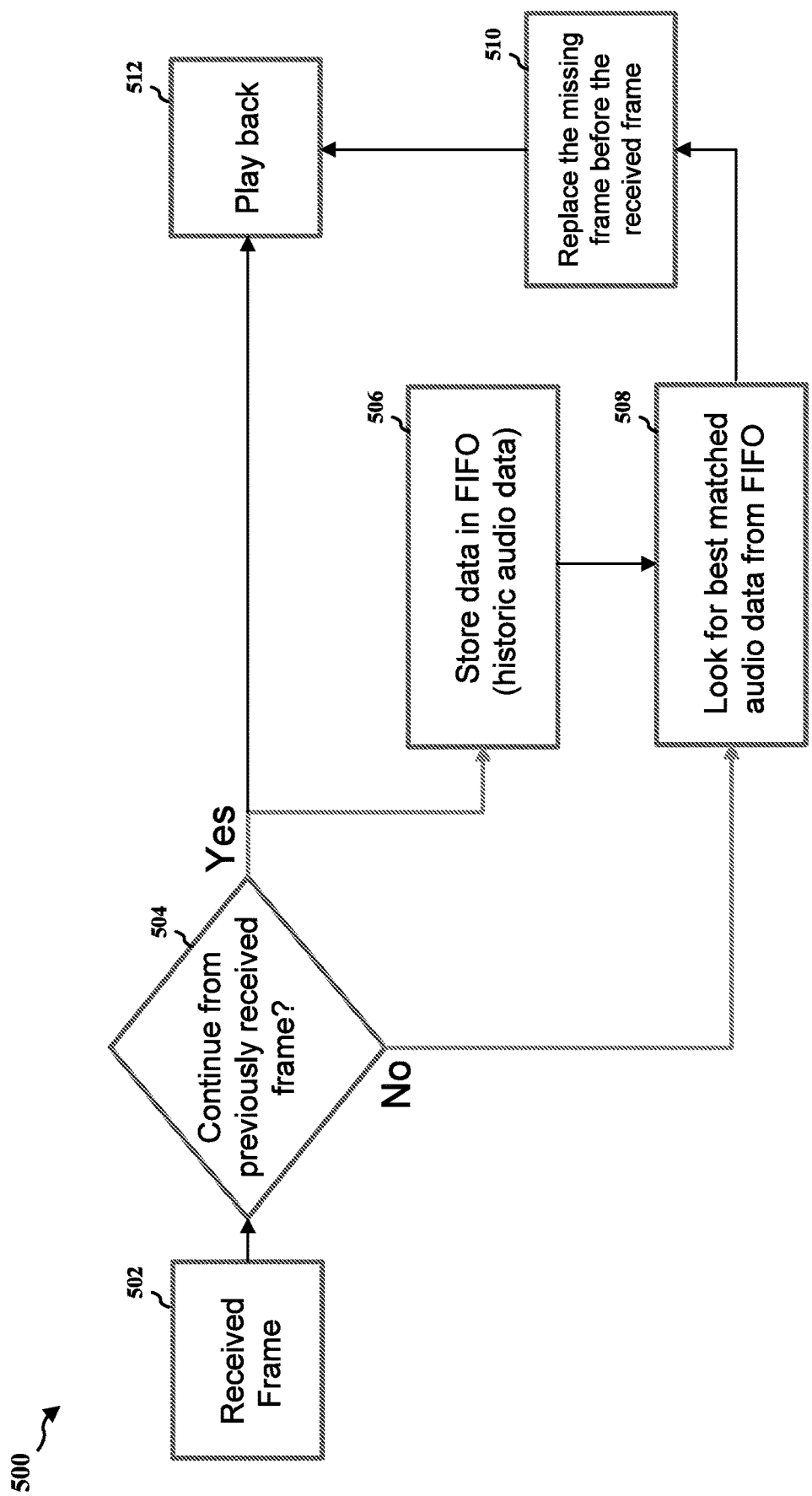
FIG. 5 is a flowchart of a method of audio error concealment.

FIG. 5 is a flowchart 500 of a method of audio error concealment. The method may be performed by an apparatus (e.g., apparatus 1402/1402' described below with reference to FIG. 14 or 15). In some embodiments, the apparatus may be a wireless speaker or a wireless headphone.

At 502, the apparatus may receive an audio frame. At 504, the apparatus may determine whether the received audio frame is continuous from a previously received audio frame. The previously received audio frame is received before the currently received audio frame, and there is no audio frame received between the previously received audio frame and the currently received audio frame. In some embodiments, the frame sequence number of the frames may indicate whether the frames are continuous. If the received audio frame is continuous from the previously received audio frame, the apparatus may proceed to 506 and 512. If the received audio frame is not continuous from the previously received audio frame, a missing audio frame is detected and the apparatus may proceed to 508.

At 506, the apparatus may store the received audio frame in an FIFO queue. The FIFO queue may store historic audio data. In some embodiments, the historic audio data stored in the FIFO queue may be recently received audio frames.

At 508, the apparatus may look for audio data from the FIFO queue that best matches the missing audio frame. At 510, the apparatus may replace the missing audio frame with the best matched audio data. The best matched audio data may be placed before (in time) the currently received audio frame. At 512, the apparatus may play back the reconstructed audio data.

Figure 6:
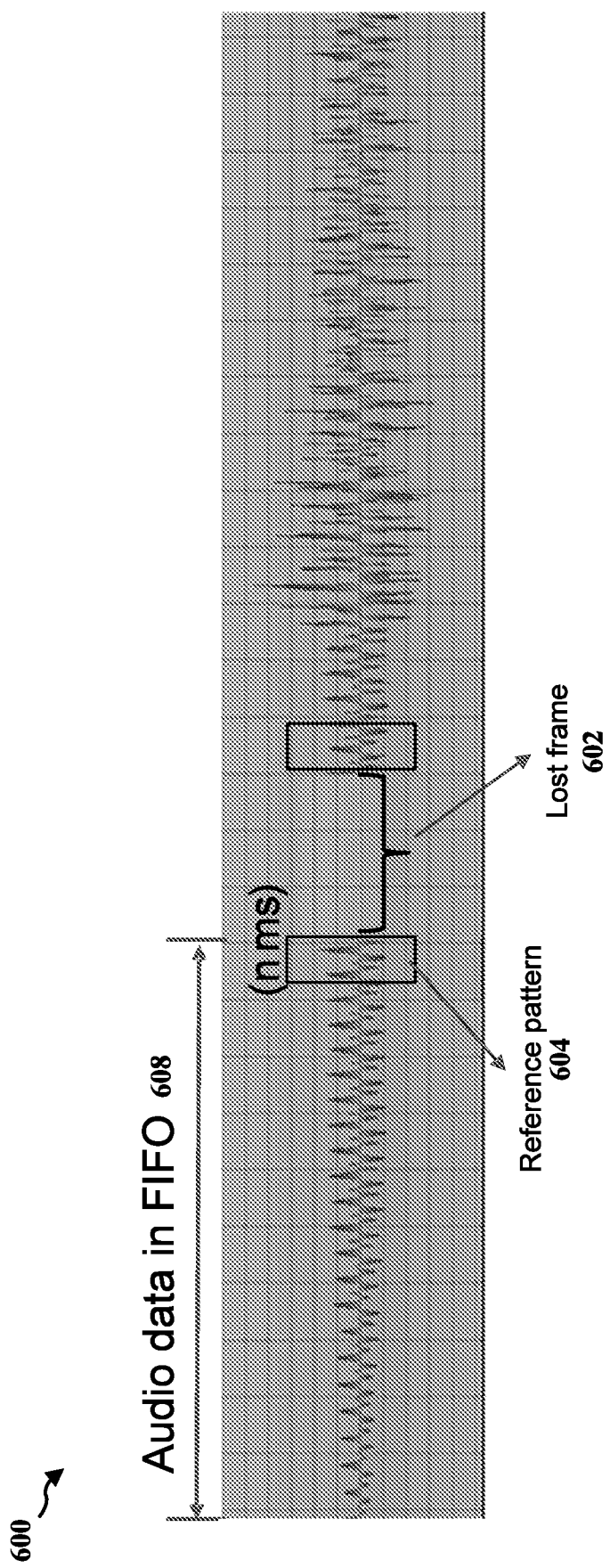
FIG. 6 is a diagram illustrating an example of selecting a reference audio pattern to search for the best matched audio data when an audio frame is lost.

In some embodiments, when a frame is lost, the last segment (e.g., n ms) of the last received audio frame may be used as the reference audio pattern to search for the best matched audio data. FIG. 6 is a diagram 600 illustrating an example of selecting a reference audio pattern to search for the best matched audio data when an audio frame is lost. In the example, when a lost frame 602 is detected, the last segment of the last received audio frame is selected as the reference pattern 604. The reference pattern 604 may be used to search for the best matched audio data in FIFO 608.

In some embodiments, the best matched segment is determined by at least one of the following methods:

The audio waveform difference between the reference segment r(n) and the candidate segment s(n) is the smallest $$Y = \sum_0^n |r(i) - s(i)|;$$

The correlation between the reference segment r(n) and the candidate segment s(n) is the largest $$Y = \sum\nolimits_{0}^{n} r(i) * s(i).$$

In some embodiments, a similarity value may be determined based on at least one of the difference or correlation between the reference segment r(n) and the candidate segment s(n), and the best matched segment may be determined based on all the similarity values. Once the best matched segment is obtained, the subsequent audio data of the best matched segment may be chosen as the replacement data for the missing frame.

Figure 7:
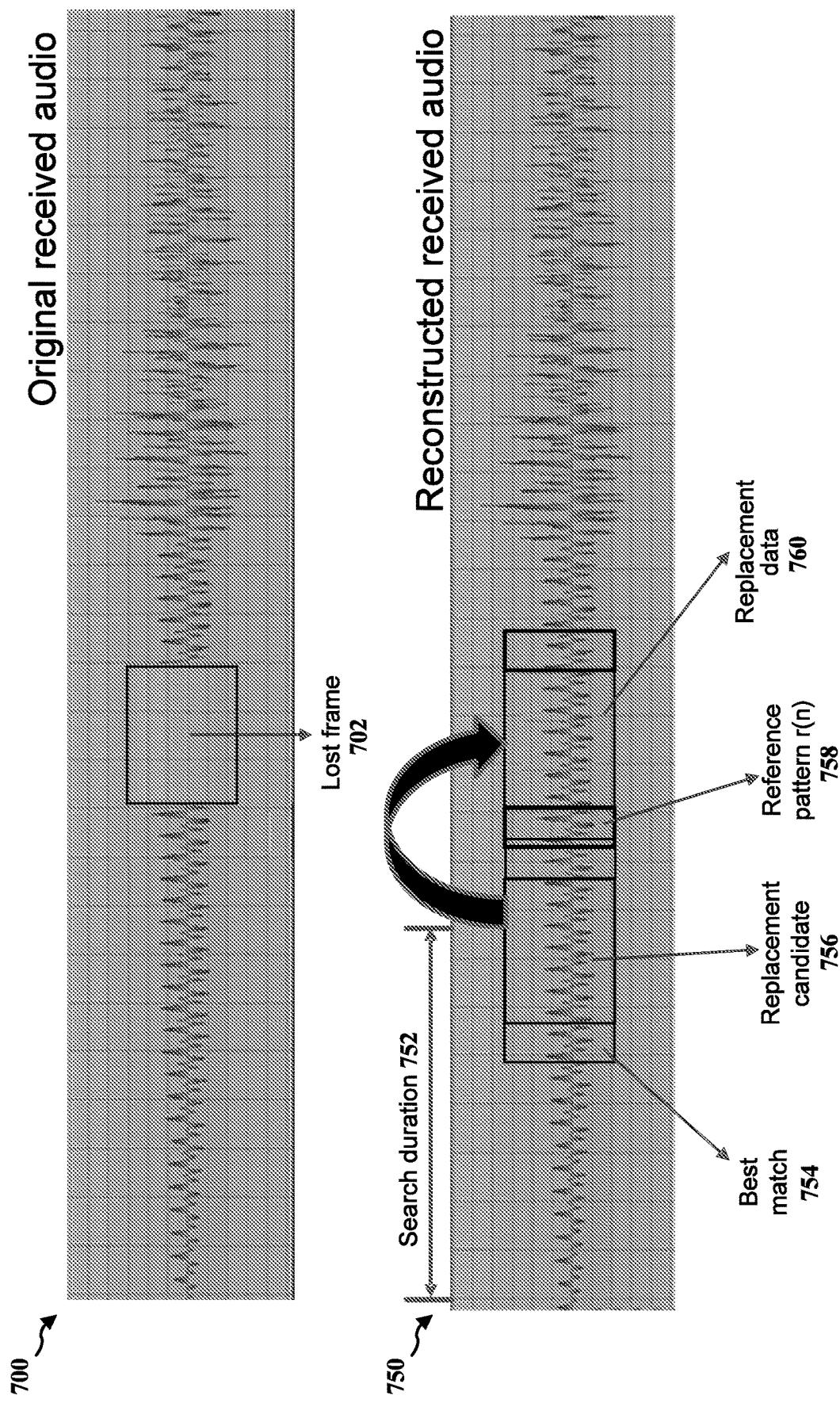
FIG. 7 illustrates an example of reconstructing missing audio frame based on the best matched segment.

FIG. 7 illustrates an example of reconstructing missing audio frame based on the best matched segment. The diagram 700 shows the waveform of the original received audio with a lost frame 702. The diagram 750 illustrates the waveform of the reconstructed received audio. In the example, the last segment 758 of the last audio frame received before the lost frame 702 is chosen as the reference pattern r(n). The reference pattern r(n) may be used to search for the best matched audio segment 754 in the search duration 752. Once the best matched audio segment 754 is identified, the subsequent audio data for the best matched segment 754 may be chosen as the replacement candidate 756 for the lost frame 702. In some embodiments, the replacement candidate 756 may have the same length (in time) as the lost frame 702. The replacement candidate 756 may be used as the replacement data 760 to replace the lost frame 702. As a result, the gap caused by the lost frame 702 may be mitigated. In some embodiments, the replacement data 760 may be a copy of the replacement candidate 756. In some embodiments, the replacement data 760 may be derived from the replacement candidate 756.

In some embodiments, in order to search for the best matched audio segment based on the reference pattern, a linear search may be performed. The linear search may search for the similar waveform from the first audio sample to the last audio sample in the audio buffer (e.g., a FIFO queue). The total number of operation is $$T=n*m,$$

n=number of audio sample,
m=size of search window.

In some embodiments, a 2-stage search of the best matched audio segment may be implemented. The first stage may make use of incremental search sequence to perform an incremental search for the similar waveform (i.e., a coarse search). In some embodiments, an incremental search sequence may be:

a linear incremental sequence, such as 1, 1, 2, 3, 4, 5, 6, 7, 8,
a linear incremental repeat sequence, such as 1, 1, 2, 2, 3, 3, 4, 4, or
a Fibonacci sequence, such as 1, 1, 2, 3, 5, 8.

The second stage may make use of a linear search sequence to perform a linear search for the best matched waveform (i.e., a refined search). The incremental search starts from the oldest audio segment in the audio buffer and gradually proceeds to newer audio segments in the buffer. The search index of the incremental search is incremented based on the incremental search sequence. For example, if the current number in the incremental search sequence is n, the search index will be incremented by n. Thus, the next audio segment to be searched in the buffer will be n audio segments after the currently searched audio segment. The linear search starts from the oldest audio segment in a search window and gradually proceeds to newer audio segments in the search window. For a linear search using a linear search sequence, the next audio segment to be searched will be the audio segment that is subsequently next to the currently searched audio segment in the search window. That is, in a linear search, the search index increments by one each time.

Figure 8:
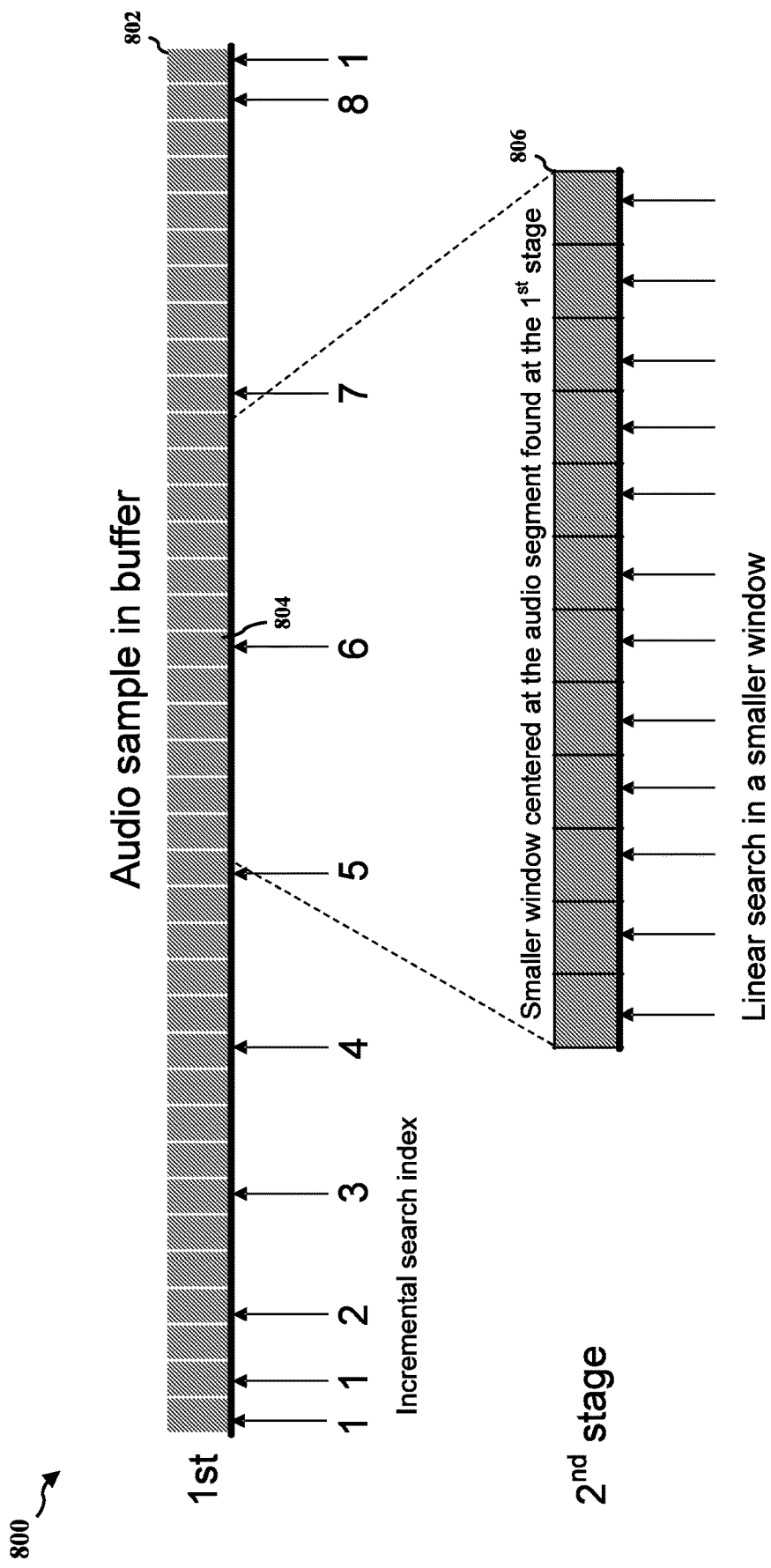
FIG. 8 is a diagram illustrating an example of the 2-stage search of the best matched audio segment.

FIG. 8 is a diagram 800 illustrating an example of the 2-stage search of the best matched audio segment. In the example, at the first stage, an incremental search sequence 1, 1, 2, 3, 4, 5, 6, 7, 8 is used to search the buffer 802 for the best matched audio segment or sample. As a result of the incremental search, audio segment 804 is identified as the best matched audio segment at the first stage. The search index for the audio segment 804 corresponds to the number '6' in the incremental search sequence.

A search window 806 is identified based on the audio segment 804. The search window 806 may be centered at the audio segment 804. In some embodiments, the search window 806 may start from the search index corresponding to the previous number (i.e., '5') in the incremental search sequence to the search index corresponding to the next number (i.e., '7') in the incremental search sequence.

At the second stage, a linear search may be performed in the search window 806. That is, every audio segment in the search window 806 may be compared with the reference pattern to find the best matched audio segment.

Figure 9:
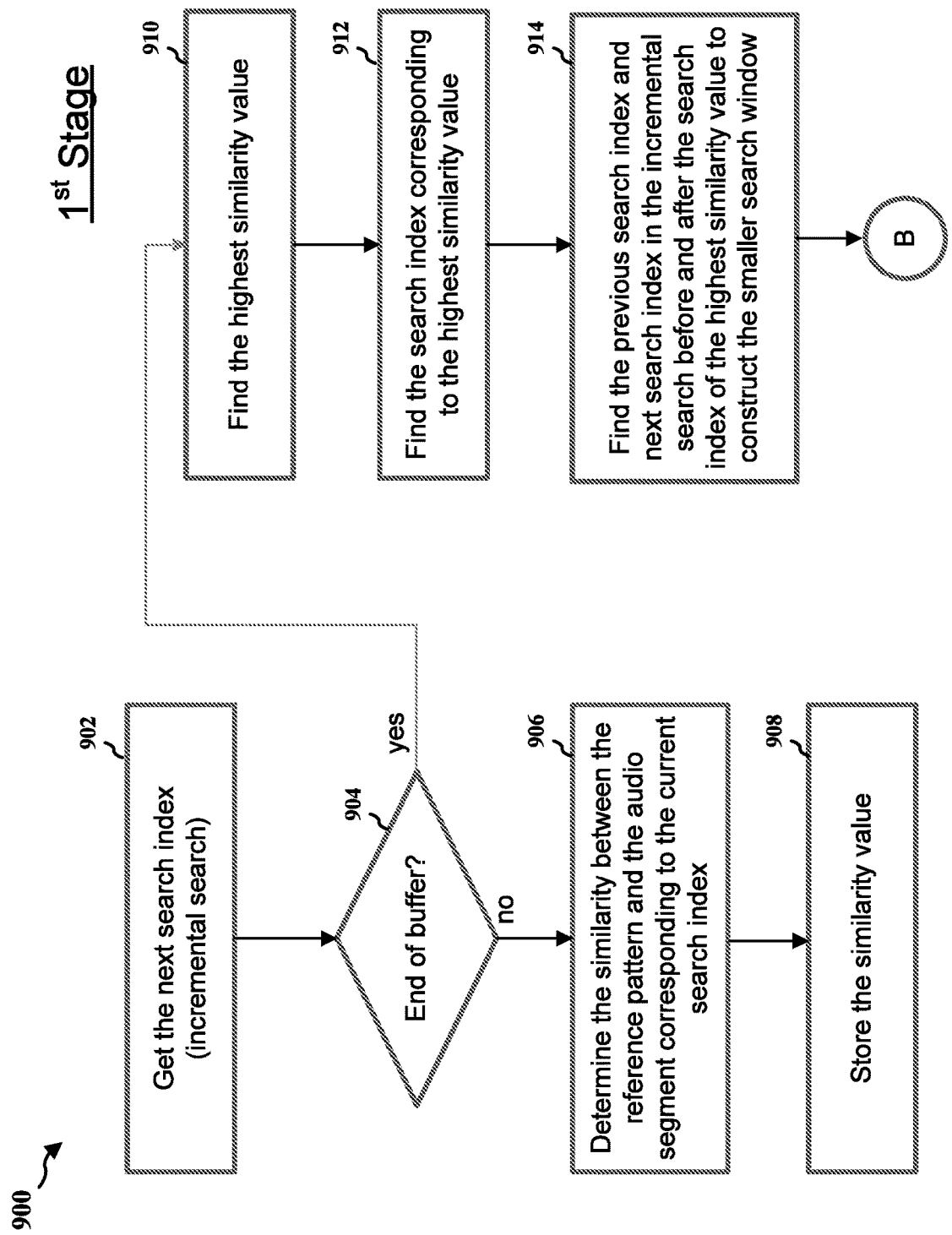
FIG. 9 is a flowchart of the first stage of a method of audio error concealment.

FIG. 9 is a flowchart 900 of the first stage of a method of audio error concealment. The method may be performed by an apparatus (e.g., apparatus 1402/1402' described below with reference to FIG. 14 or 15). In some embodiments, the apparatus may be a wireless speaker or a wireless headphone. In some embodiments, the operations performed in the method may correspond to operations described above with reference to FIGS. 4-8.

At 902, the apparatus may get the next search index of an incremental search sequence, and set it as current search index. At 904, the apparatus may determine whether the end of the search buffer is reached based on the current search index. If the end of the search buffer is reached, the apparatus may proceed to 910. If the end of the search buffer is not reached, the apparatus may proceed to 906.

At 906, the apparatus may determine the similarity between the reference pattern and the audio segment corresponding to the current search index. At 908, the apparatus may store the determined similarity value.

At 910, the apparatus may find the highest similarity value among all the stored similarity values. At 912, the apparatus may find the search index corresponding to the highest similarity value.

At 914, the apparatus may find the previous search index and the next search index in the incremental search before and after the search index of the highest similarity value to construct the smaller search window. The apparatus may then proceed to connection point B.

Figure 10:
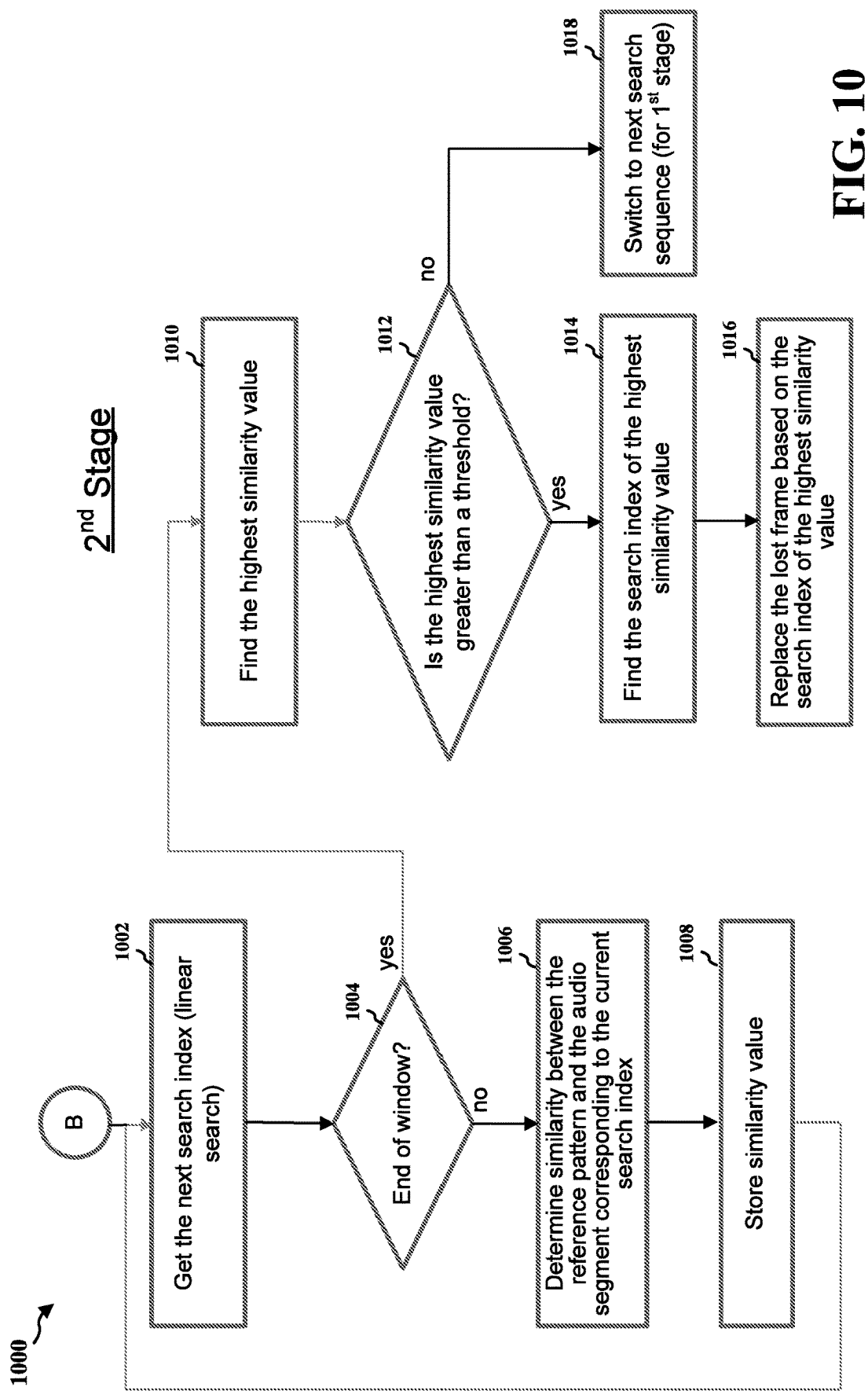
FIG. 10 is a flowchart of the second stage of the method of audio error concealment.

FIG. 10 is a flowchart 1000 of the second stage of the method of audio error concealment. The operations of the flowchart 1000 continues from the operations described above with reference to FIG. 9. The method may be performed by an apparatus (e.g., apparatus 1402/1402' described below with reference to FIG. 14 or 15). In some embodiments, the apparatus may be a wireless speaker or a wireless headphone. In some embodiments, the operations performed in the method may correspond to operations described above with reference to FIGS. 4-8.

Continuing from the connection point B, at 1002, the apparatus may get the next search index of a linear search, and set it as current search index. At 1004, the apparatus may determine whether the end of the search window is reached based on the current search index. If the end of the search window is reached, the apparatus may proceed to 1010. If the end of the search window is not reached, the apparatus may proceed to 1006. In some embodiments, the search window may be constructed by operations described above in 914 of FIG. 9.

At 1006, the apparatus may determine the similarity between the reference pattern and the audio segment corresponding to the current search index. At 1008, the apparatus may store the determined similarity value. At 1010, the apparatus may find the highest similarity value among all the stored similarity values.

At 1012, the apparatus may determine whether the highest similarity value is greater than a threshold. If the highest similarity value is greater than the threshold, the apparatus may proceed to 1014. If the highest similarity value is not greater than the threshold, the apparatus may proceed to 1018. In some embodiments, the threshold may be a value to indicate the confidence level of the waveform found.

At 1014, the apparatus may find the search index corresponding to the highest similarity value. At 1016, the apparatus may replace the lost frame based on the search index of the highest similarity value. In some embodiments, the audio data immediately subsequent to the audio segment that has the highest similarity value may be chosen to replace/reconstruct the lost frame. At 1018, the apparatus may switch to the next search sequence for the first stage of the method.

In some embodiments, for an incremental search using a Fibonacci sequence 1, 1, 2, 3, 5, 8, the total number of operations $$T = \left(\frac{6}{20}\right) n * m,$$

n=number of audio sample,
m=size of search window.

Figure 11:
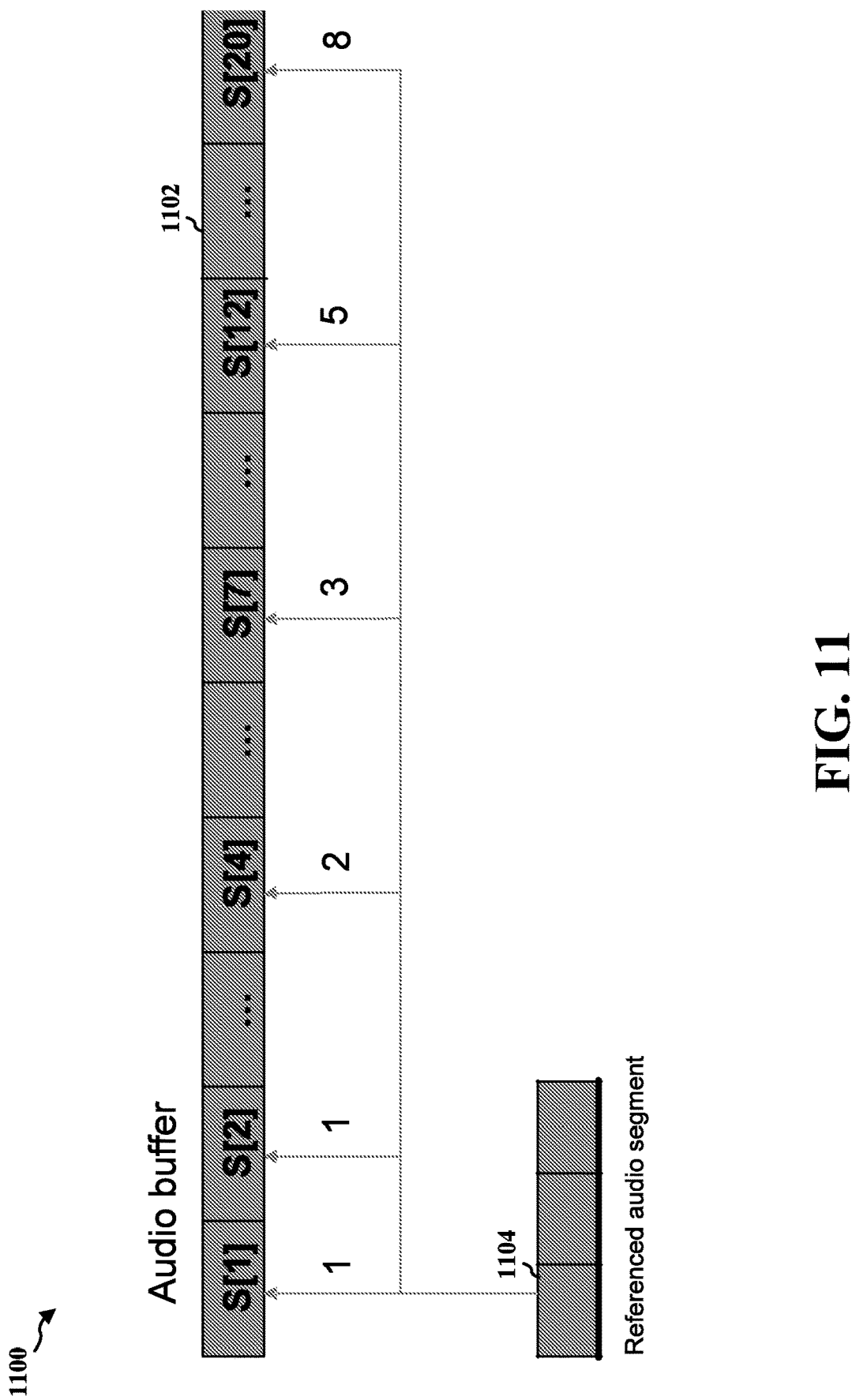
FIG. 11 is a diagram illustrating an example of using an incremental search sequence to perform an incremental search on an audio buffer.

FIG. 11 is a diagram 1100 illustrating an example of using an incremental search sequence to perform an incremental search on an audio buffer 1102. In some embodiments, the incremental search in this example may be performed at the first stage of the 2-stage search described above with references to FIGS. 8 and 9.

In the example, the Fibonacci sequence is used to perform the incremental search. Each number in the Fibonacci sequence corresponds to an audio segment in the audio buffer 1102. For example, the first '1' in the sequence corresponds to S[1]; the second '1' in the sequence corresponds to S[2]; the '2' in the sequence corresponds to S[4], which is two segments after S[2]; the '3' in the sequence corresponds to S[7], which is three segments after S[4], and so on.

For each iteration of the incremental search, the current number in the search sequence serves as the starting point of the audio buffer 1102. For example, when the current number is the first '1' in the sequence, the reference audio segment 1104 may be compared with the audio data started from S[1] to determine a similarity value between them; when the current number is the '2' in the sequence, the reference audio segment 1104 may be compared with the audio data started from S[4] to determine a similarity value between them, and so on.

In some embodiments, the number of operations is reduced by a ratio of $$\left(1 - \frac{6}{20}\right)$$

if the Fibonacci sequence described above is used in the incremental search. By performing audio error concealment, the continuity of audio waveform is preserved, and the popping/cracking noise from audio playback is reduced.

Figure 12:
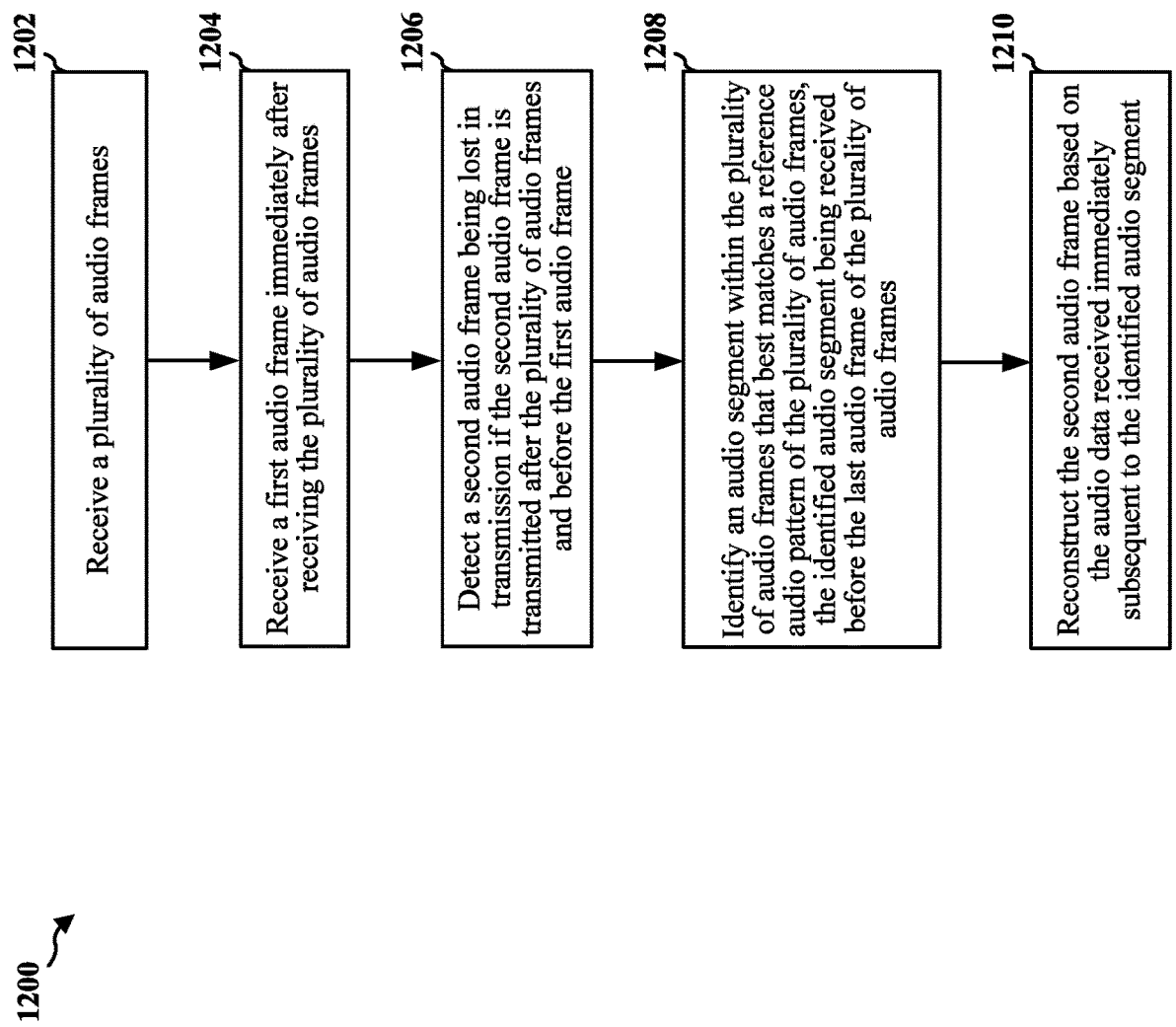
FIG. 12 is a flowchart of a method of audio error concealment.

FIG. 12 is a flowchart 1200 of a method of audio error concealment. The method may be performed by an apparatus (e.g., apparatus 1402/1402' described below with reference to FIG. 14 or 15). In some embodiments, the apparatus may be a wireless speaker or a wireless headphone. In some embodiments, the operations performed in the method may correspond to operations described above with reference to FIGS. 4-11.

At 1202, the apparatus may receive a plurality of audio frames. In some embodiments, the plurality of audio frames may be the audio frames in the search window 402 described above in FIG. 4 or the audio data in the FIFO 608 described above in FIG. 6. In some embodiments, an audio frame may include amplitude information of an audio signal over a predetermined period of time. In some embodiments, each audio frame may be assigned a frame sequence number to indicate the order of transmission.

At 1204, the apparatus may receive a first audio frame as the next audio frame received after the plurality of audio frames. At 1206, the apparatus may detect a second audio frame being lost in transmission. The second audio frame is transmitted after the plurality of audio frames and before the first audio frame.

At 1208, the apparatus may identify an audio segment within the plurality of audio frames that best matches a reference audio pattern of the plurality of audio frames. The identified audio segment may be received before the last audio frame of the plurality of audio frames. In some embodiments, the reference audio pattern may be the last audio segment of the last audio frame of the plurality of audio frames.

In some embodiments, to identify the audio segment, the apparatus may, for each candidate audio segment, perform at least one of: comparing audio waveform of the candidate audio segment and audio waveform of the reference audio pattern; or determining correlation between the candidate audio segment and the reference audio pattern. In some embodiments, the identified audio segment may have at least one of: the smallest audio waveform difference with the reference audio pattern; or the largest correlation with the reference audio pattern.

At 1210, the apparatus may reconstruct the second audio frame based on the audio data received subsequent to the identified audio segment. In some embodiments, the apparatus may further play back the reconstructed second audio frame after the plurality of audio frames and before the first audio frame.

Figure 13:
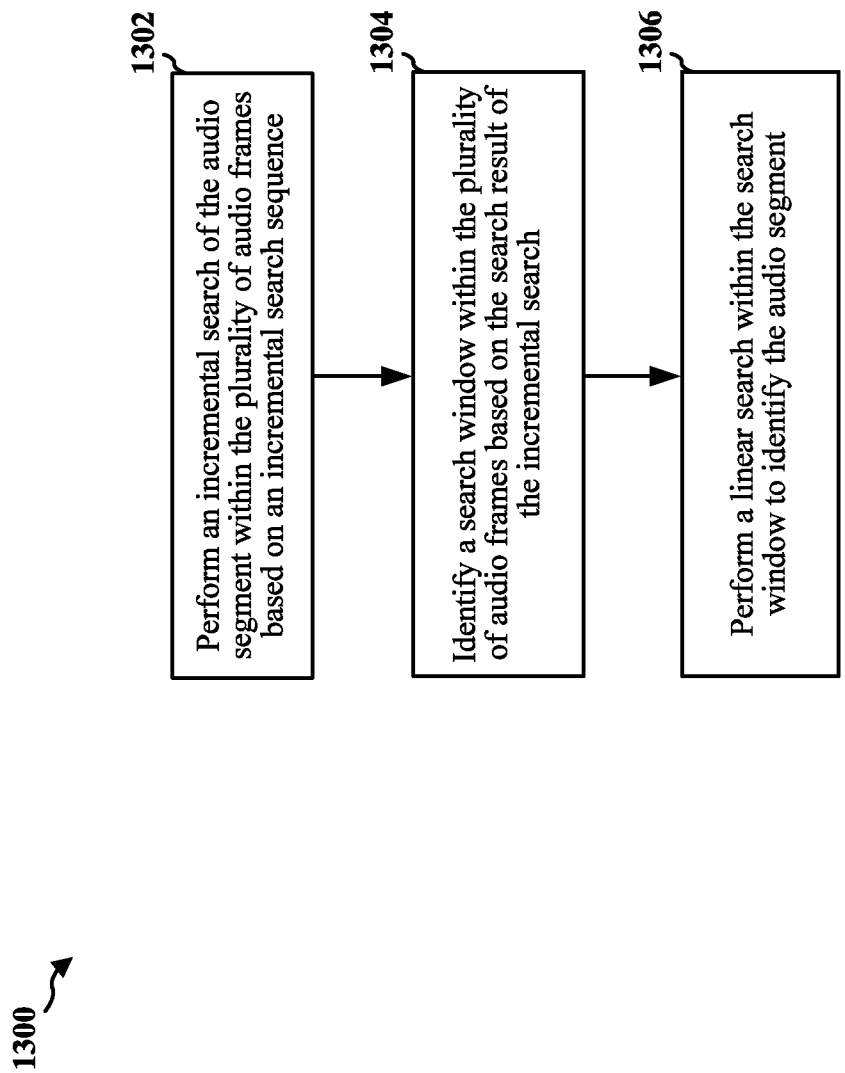
FIG. 13 is a flowchart of a method of identifying audio segment within the plurality of audio frames that best matches the reference audio pattern of the plurality of audio frames.

FIG. 13 is a flowchart 1300 of a method of identifying audio segment within the plurality of audio frames that best matches the reference audio pattern of the plurality of audio frames. The method may be performed by an apparatus (e.g., apparatus 1402/1402' described below with reference to FIG. 14 or 15). In some embodiments, the apparatus may be a wireless speaker or a wireless headphone. In some embodiments, the operations performed in the method may correspond to the operations described above with reference to 1208 in FIG. 12.

At 1302, the apparatus may perform an incremental search of the audio segment within the plurality of audio frames based on an incremental search sequence. In some embodiments, the incremental search sequence may be one of a linear incremental sequence, a linear incremental repeat sequence, or a Fibonacci sequence.

At 1304, the apparatus may identify a search window within the plurality of audio frames based on the search result of the incremental search.

At 1306, the apparatus may perform a linear search within the search window to identify the audio segment. In some embodiments, during the incremental search or the linear search, the apparatus may, for each candidate audio segment, perform at least one of: comparing audio waveform of the candidate audio segment and audio waveform of the reference audio pattern; or determining correlation between the candidate audio segment and the reference audio pattern. In some embodiments, the identified audio segment may have at least one of: the smallest audio waveform difference with the reference audio pattern; or the largest correlation with the reference audio pattern.

Figure 14:
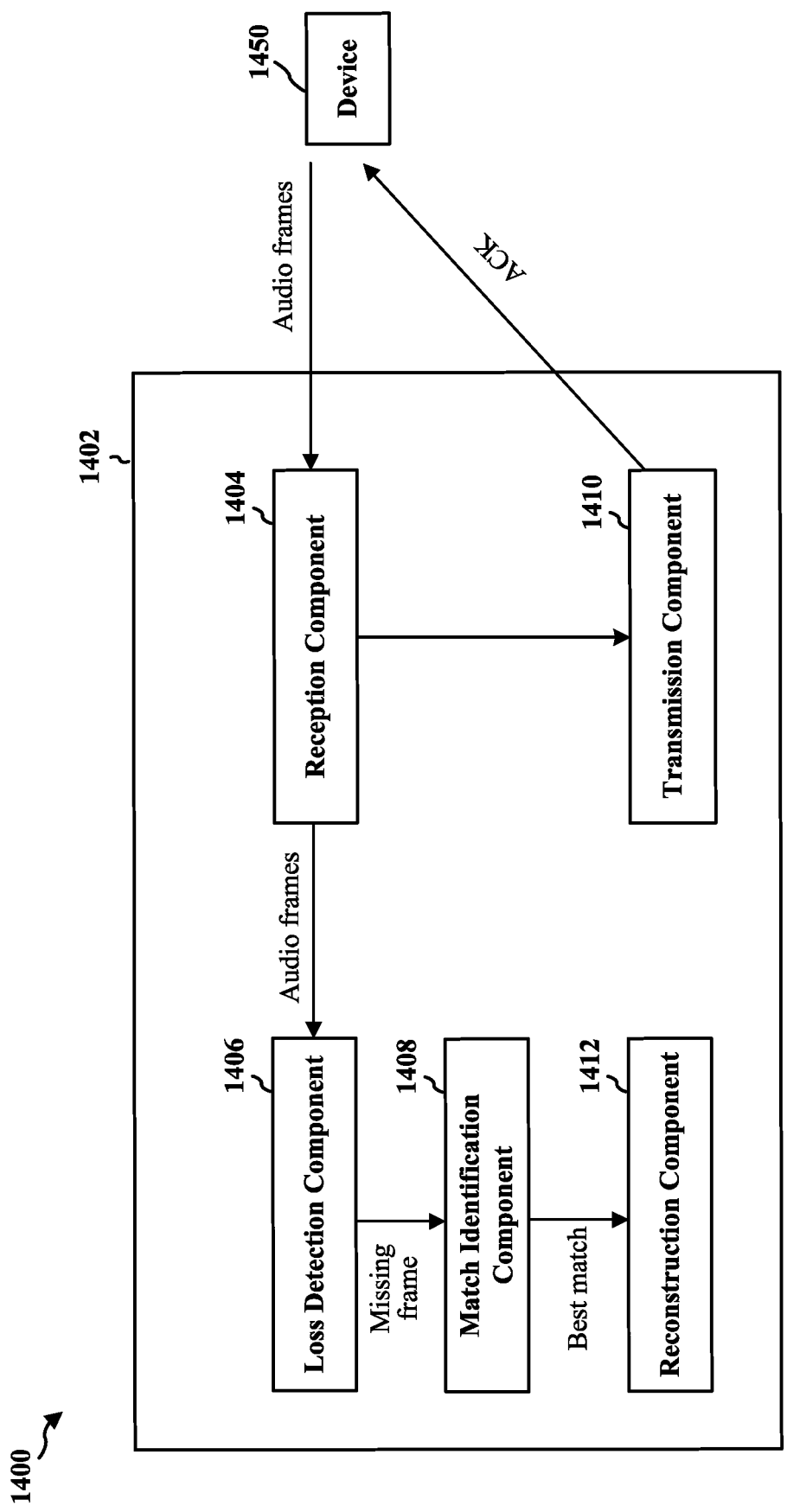
FIG. 14 is a conceptual data flow diagram illustrating the data flow between different means/components in an exemplary apparatus.

FIG. 14 is a conceptual data flow diagram 1400 illustrating the data flow between different means/components in an exemplary apparatus 1402. In some embodiments, the apparatus 1402 may be a wireless speaker or a wireless headphone. The apparatus 1402 may include a reception component 1404 that receives audio frames from a device 1450 that includes a transmitter. In one embodiment, the reception component 1404 may perform the operations described above with reference to 1202 or 1204 in FIG. 12.

The apparatus 1402 may include a transmission component 1410 that transmits acknowledgments (ACK) regarding the received audio frames to the device 1450. The reception component 1404 and the transmission component 1410 may collaborate to coordinate the communication of the apparatus 1402.

The apparatus 1402 may include a loss detection component 1406 that is configured to detect a missing frame within the received audio frames. In one embodiment, the loss detection component 1406 may perform the operations described above with reference to 1206 in FIG. 12.

The apparatus 1402 may include a match identification component 1408 that is configured to identify audio data that best matches the missing frame. In one embodiment, the match identification component 1408 may perform the operations described above with reference to 1208 in FIG. 12, or FIG. 13.

The apparatus 1402 may include a reconstruction component 1412 that is configured to reconstruct the missing frame based on the identified best match audio data. In one embodiment, the reconstruction component 1412 may perform the operations described above with reference to 1210 in FIG. 12.

The apparatus 1402 may include additional components that perform each of the blocks of the algorithm in the aforementioned flowcharts of FIGS. 5, 9, 10, 12, and 13. As such, each block in the aforementioned flowcharts of FIGS. 5, 9, 10, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
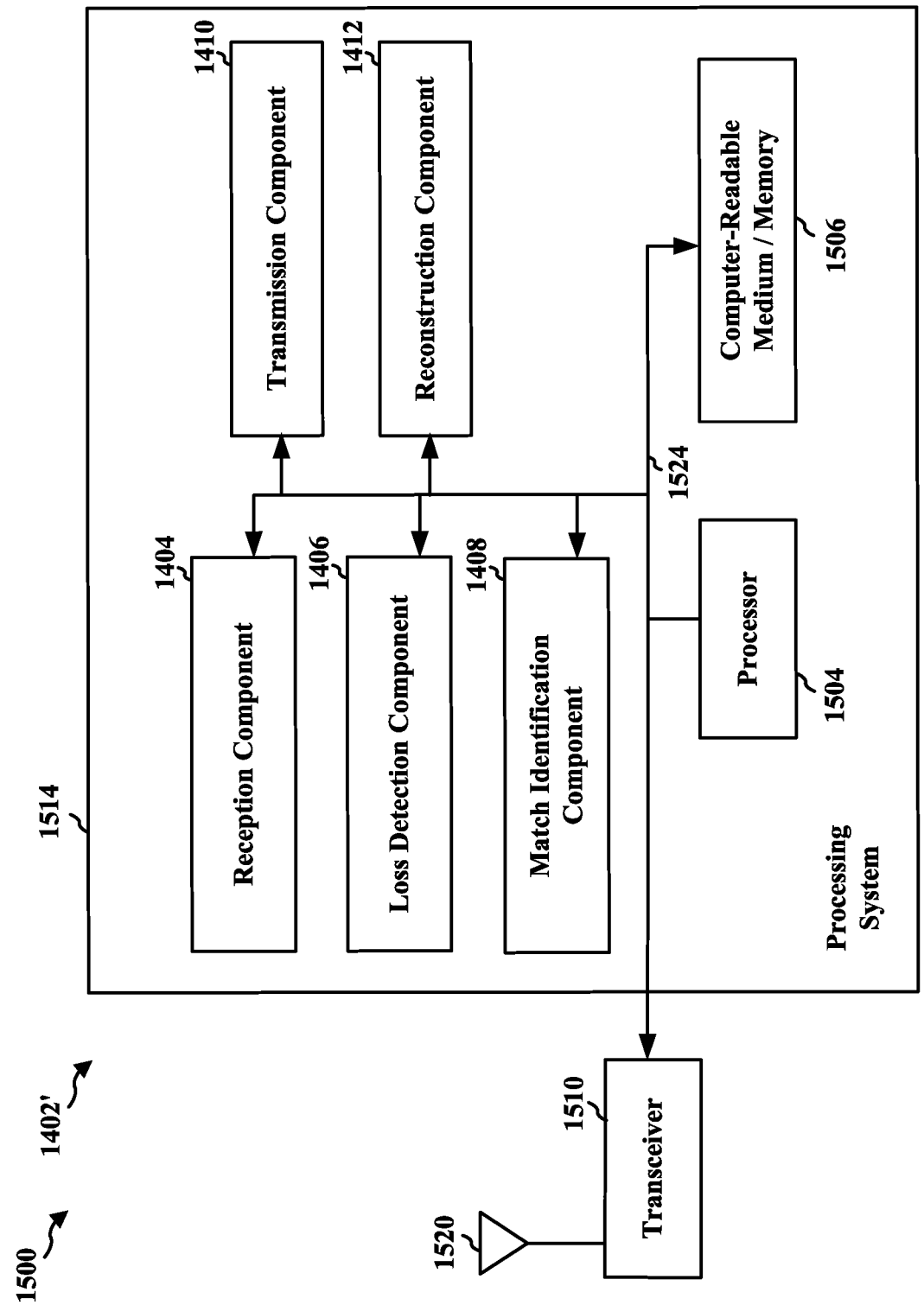
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. In one embodiment, the apparatus 1402' may be the apparatus 1402 described above with reference to FIG. 14. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412 and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1410, and based on the received information, generates a signal to be applied to the one or more antennas 1520.

The processing system 1514 includes a processor 1504 coupled to a computer-readable medium/memory 1506. The processor 1504 is responsible for general processing, including the analyzation of data gathered by the apparatus itself through its own sensors and the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412. The components may be software components running in the processor 1504, resident/stored in the computer readable medium/memory 1506, one or more hardware components coupled to the processor 1504, or some combination thereof.

In the following, various aspects of this disclosure will be illustrated:

Example 1 is a method or apparatus for audio error concealment. The apparatus may receive a plurality of audio frames. The apparatus may receive a first audio frame immediately after receiving the plurality of audio frames. The apparatus may detect a second audio frame being lost in transmission. The second audio frame is transmitted after the plurality of audio frames and before the first audio frame. The apparatus may identify an audio segment within the plurality of audio frames that best matches a reference audio pattern of the plurality of audio frames. The identified audio segment may be received before the last audio frame of the plurality of audio frames. The apparatus may reconstruct the second audio frame based on audio data received immediately subsequent to the identified audio segment.

In Example 2, the subject matter of Example 1 may optionally include that, to identify the audio segment, the apparatus may perform an incremental search of the audio segment within the plurality of audio frames based on an incremental search sequence.

In Example 3, the subject matter of Example 2 may optionally include that the incremental search sequence may be one of a linear incremental sequence, a linear incremental repeat sequence, or a Fibonacci sequence.

In Example 4, the subject matter of Example 2 or 3 may optionally include that, to identify the audio segment, the apparatus may further: identify a search window within the plurality of audio frames based on a search result of the incremental search; and perform a linear search within the search window to identify the audio segment.

In Example 5, the subject matter of any one of Examples 1 to 4 may optionally include that an audio frame may include amplitude information of an audio signal over a predetermined period of time.

In Example 6, the subject matter of any one of Examples 1 to 5 may optionally include that each audio frame may be assigned a frame sequence number to indicate an order of transmission.

In Example 7, the subject matter of any one of Examples 1 to 6 may optionally include that, to identify the audio segment, the apparatus may, for each candidate audio segment, perform at least one of: comparing audio waveform of the candidate audio segment and audio waveform of the reference audio pattern; or determining correlation between the candidate audio segment and the reference audio pattern.

In Example 8, the subject matter of Example 7 may optionally include that the identified audio segment may have at least one of: a smallest audio waveform difference with the reference audio pattern; or a largest correlation with the reference audio pattern.

In Example 9, the subject matter of any one of Examples 1 to 8 may optionally include that the apparatus may play back the reconstructed second audio frame after the plurality of audio frames and before the first audio frame.

In Example 10, the subject matter of any one of Examples 1 to 9 may optionally include that the reference audio pattern is the last audio segment of the last audio frame of the plurality of audio frames.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of audio error concealment, the method comprising:
   receiving a plurality of audio frames;
   receiving a first audio frame after the receiving of the plurality of audio frames;
   detecting a second audio frame being lost in transmission, the second audio frame being transmitted after the plurality of audio frames and before the first audio frame;
   performing a first stage search within the plurality of audio frames using an incremental search sequence, wherein the incremental search starts from an oldest audio frame and gradually proceeds to newer audio frames in the plurality of audio frames, and a size of search indexes of the incremental search is incremented based on an incremental search sequence;
   finding a first highest similarity value among respective first similarity values of first audio segments in the plurality of audio frames searched in the first stage search, a similarity value being a measure of similarity between a reference audio pattern and audio segments within the plurality of audio frames;
   identifying a first stage best-match audio segment that best matches the reference audio pattern of the plurality of audio frames, wherein the first stage best-match audio segment has the first highest similarity value;
   identifying a search window within the plurality of audio frames based on the first stage best-match audio segment;
   performing a second stage search within the search window using a linear search sequence;
   finding a second highest similarity value among respective second similarity values of second audio segments in the search window searched in the second stage search;
   determining the second highest similarity value is higher than a threshold subsequent to finding the second highest similarity value;
   identifying a second stage best-match audio segment in response to determining the second highest similarity value is higher than the threshold, the second stage best-match audio segment having the second highest similarity value;

repeating the first stage search using a next incremental search sequence in response to determining the second highest similarity value is less than or equal to the threshold, the next incremental search sequence being a different incremental search sequence; and reconstructing the second audio frame based on audio data received subsequent to the identified second stage best-match audio segment.

2. The method of claim 1, wherein the incremental search sequence is one of a linear incremental sequence, a linear incremental repeat sequence, or a Fibonacci sequence.

3. The method of claim 1, wherein each audio frame comprises amplitude information of an audio signal over a predetermined period of time.

4. The method of claim 1, wherein each audio frame is assigned a frame sequence number to indicate an order of transmission.

5. The method of claim 1, wherein finding the first highest similarity value for identifying the first stage best-match audio segment and/or finding the second highest similarity value for identifying the second stage best-match audio segment comprises, for each candidate audio segment, performing at least one of:
comparing audio waveform of the candidate audio segment and audio waveform of the reference audio pattern; or determining correlation between the candidate audio segment and the reference audio pattern.

6. The method of claim 5, wherein the identified first stage best-match audio segment and/or the identified second stage best-match audio segment has at least one of:
a smallest audio waveform difference with the reference audio pattern; or a largest correlation with the reference audio pattern.

7. The method of claim 1, further comprising playing back the reconstructed second audio frame after the plurality of audio frames and before the first audio frame.

8. The method of claim 1, wherein the reference audio pattern is a last audio segment of a last audio frame of the plurality of audio frames.

9. The method of claim 1, wherein the search window is centered at the first stage best-match audio segment identified at the first stage.

10. The method of claim 1, wherein a current search index for the first stage best-match audio segment identified at the first stage corresponds to a current number in the incremental search sequence, and the search window starts from a previous search index corresponding to a previous number in the incremental search sequence to a next search index corresponding to a next number in the incremental search sequence, the current search index being the previous search index incremented by the current number and the next search index being the current search index incremented by the next number.

11. An apparatus for audio error concealment, the apparatus comprising:
a memory; and
at least one processor coupled to the memory and configured to:
receive a plurality of audio frames;
receive a first audio frame after the receiving of the plurality of audio frames;
detect a second audio frame being lost in transmission, the second audio frame being transmitted after the plurality of audio frames and before the first audio frame;
perform a first stage search within the plurality of audio frames using an incremental search sequence, wherein the incremental search starts from an oldest audio frame and gradually proceeds to newer audio frames in the plurality of audio frames, and
a size of search indexes of the incremental search is incremented based on an incremental search sequence;
find a first highest similarity value among respective first similarity values of first candidate audio segments in the plurality of audio frames searched in the first stage search, a similarity value being a measure of similarity between a reference audio pattern and audio segments within the plurality of audio frames;
identify a first stage best-match audio segment that best matches the reference audio pattern of the plurality of audio frames, wherein the first stage best-match audio segment has a first highest similarity value;
identify a search window within the plurality of audio frames based on the first stage best-match audio segment;
perform a second stage search within the search window using a linear search sequence;
find a second highest similarity value among respective second similarity values of second candidate audio segments in the search window searched in the second stage search;
determine the second highest similarity value is higher than a threshold subsequent to finding the second highest similarity value;
identify a second stage best-match audio segment in response to the determination of the second highest similarity value being higher than the threshold, the second stage best-match audio segment having the second highest similarity value;
repeat the first stage search using a next incremental search sequence in response to determining the second highest similarity value is less than or equal to the threshold, the next incremental search sequence being a different incremental search sequence; and
reconstruct the second audio frame based on audio data received subsequent to the identified second stage best-match audio segment.

12. The apparatus of claim 11, wherein the incremental search sequence is one of a linear incremental sequence, a linear incremental repeat sequence, or a Fibonacci sequence.

13. The apparatus of claim 11, wherein each audio frame comprises amplitude information of an audio signal over a predetermined period of time.

14. The apparatus of claim 11, wherein each audio frame is assigned a frame sequence number to indicate an order of transmission.

15. The apparatus of claim 11, wherein, to find the first highest similarity value for identifying the first stage best-match audio segment and/or find the second highest similarity value for identifying the second stage best-match audio segment, the at least one processor is configured to, for each candidate audio segment, perform at least one of:
comparing audio waveform of the candidate audio segment and audio waveform of the reference audio pattern; or determining correlation between the candidate audio segment and the reference audio pattern.

16. The apparatus of claim 15, wherein the identified first stage best-match audio segment and/or the identified second stage best-match audio segment has at least one of:
a smallest audio waveform difference with the reference audio pattern; or a largest correlation with the reference audio pattern.

17. The apparatus of claim 11, wherein the at least one processor is further configured to play back the reconstructed second audio frame after the plurality of audio frames and before the first audio frame.

18. The apparatus of claim 11, wherein the reference audio pattern is a last audio segment of a last audio frame of the plurality of audio frames.

19. The apparatus of claim 11, wherein a current search index for the first stage best-match audio segment identified at the first stage corresponds to a current number in the incremental search sequence, and the search window starts from a previous search index corresponding to a previous number in the incremental search sequence to a next search index corresponding to a next number in the incremental search sequence, the current search index being the previous search index incremented by the current number and the next search index being the current search index incremented by the next number.

* * * * *